July 2, 1957        M. E. FRY        2,798,144

DOMESTIC APPLIANCE

Filed Jan. 20, 1954

INVENTOR.

Millard E. Fry

BY *R. K. Candor*

His Attorney

2,798,144
DOMESTIC APPLIANCE

Millard E. Fry, Dayton, Ohio, assignor to General Motors Corporation, Detroit, Mich., a corporation of Delaware Application January 20, 1954, Serial No. 405,155

1 Claim. (Cl. 219—44)

This invention relates to a domestic appliance and more particularly to cooking utensils provided with their own heating system.

Cooking utensils having their own electrical heating system have certain advantages such as minimum waste of electrical energy and the possibilities of use anywhere within the limit of reach of an electrical supply. Such utensils, however, are more expensive than ordinary utensils.

It is an object of my invention to provide a skillet having an electrical heating means embedded in its bottom.

It is another object of my invention to provide a reversible cooking utensil in the shape of and usable as a skillet while the bottom face is provided with a surface usable as a griddle.

Further objects and advantages of the present invention will be apparent from the following description, reference being had to the accompanying drawings wherein a preferred form of the invention is clearly shown.

Figure 1:
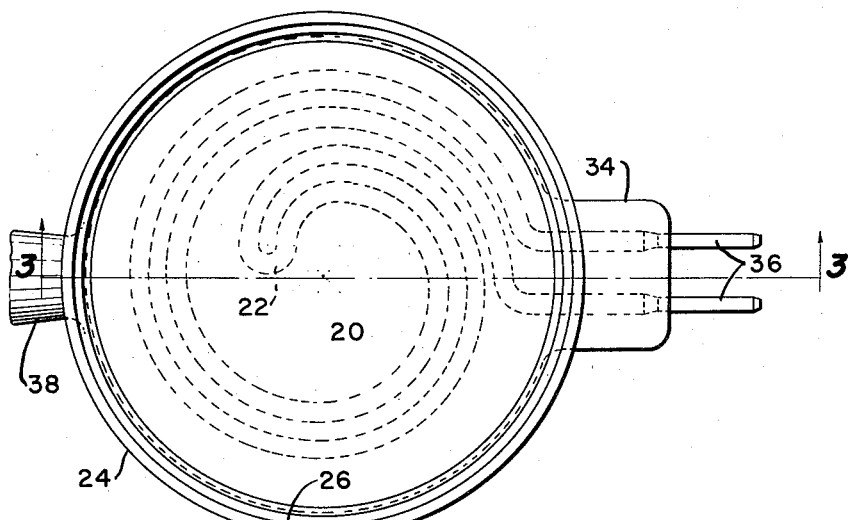
Figure 1 is a top view of a utensil embodying my invention.
Figure 2:
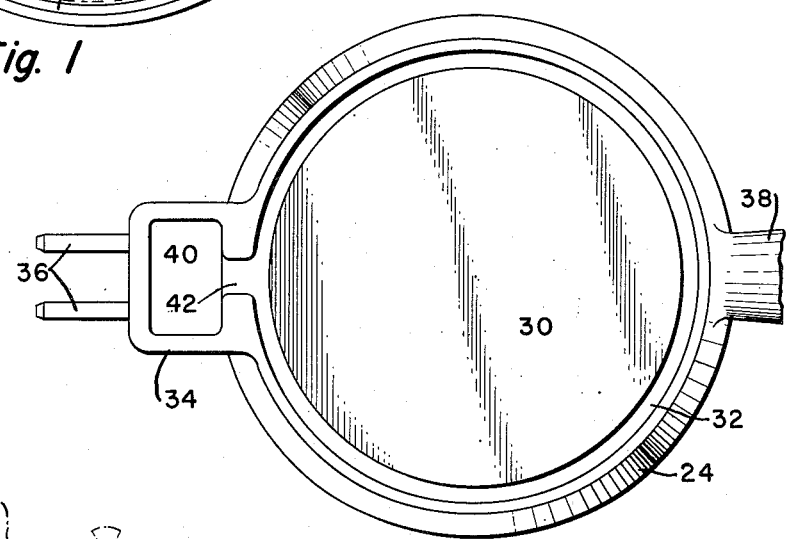
Figure 2 is a bottom view of Figure 1.

Referring now to the drawings there is shown a skillet including a plane bottom wall 20 having embedded therein a sheathed tubular type of electrical heating unit 22. Around the plane bottom wall 20 is an upstanding vertical wall 24 which may have a recessed shoulder 26 adapted to support a lid 28 shown in dot and dash outline.

The bottom of the skillet is provided with a substantially smooth plane surface 30 having a shallow groove 32 extending equidistant from the edge around the plane surface 30. The skillet may be provided with a terminal portion 34 projecting to one side from which protrudes the electrical connectors 36 which may connect to any suitable electrical supply. The skillet may also be provided with a suitable handle 38. The terminal portion 34 includes a well 40 which receives any overflow of grease from the shallow groove 32 through an overflow connection 42.

Figure 3:
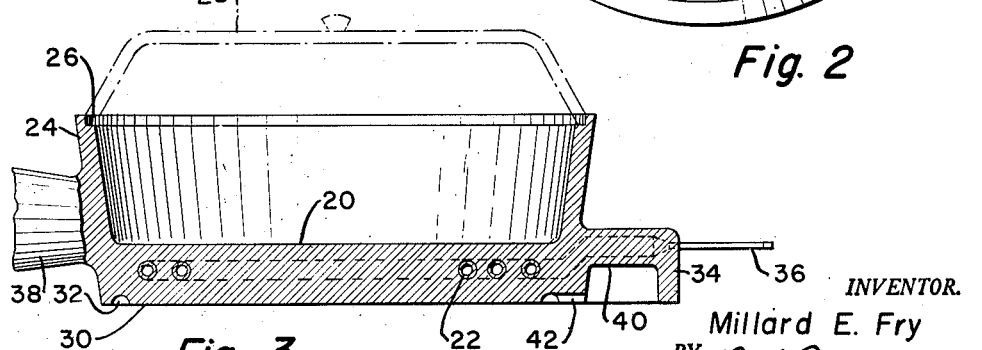
Figure 3 is a sectional view taken along the line 3—3 of Figure 1.

The bottom portion as well as the upstanding walls 24 and the terminal portion 34 may be cast of any suitable metal such as aluminum with the sheathed electric heating means 22 cast therein. The sheathed tubular heating means 22 may extend in any suitable configuration such as a spiral configuration as is shown in Figure 1. With this arrangement the skillet may be used as a skillet in the position shown in Figures 1 and 3 while it may also be reversed or inverted and the surface 30 used as a griddle. The electric heating means 22 being embedded directly in the bottom will provide direct and efficient heating in either position of use. This heating means 22 may be provided with any suitable control.

The making of the double use electrically heated utensil in this way so that it is reversible or invertible for two different cooking operations makes the cost very little more than a single use electrical heated utensil. The skillet may be provided with a long electrical conductor for connection to a power supply so that it may be used anywhere within reach of a power supply. The electrical conductors 36 may also be inserted directly into a receptacle on the back splasher of the top of an electric range. Such a receptacle may be provided with an infinite heat control or other control for varying the power input to the heater 22.

While the form of embodiment of the invention as herein disclosed constitutes a preferred form, it is to be understood that other forms might be adopted as may come within the scope of the claim which follows.

What is claimed is as follows:

A cooking utensil including a substantially plane portion of metal having an electrical heating means embedded therein, one side of said plane portion being provided with an upstanding endless wall to form a receptacle on the one face of the plane portion, said utensil being invertible, the opposite side of said plane portion being provided with a substantially plane smooth surface for use as a griddle, and bounded by a relatively hollow grease collecting channel, and a relatively deep grease collecting well in said metal adjacent said relatively shallow channel and communicating with said shallow channel for receiving grease from said shallow channel, said utensil having a handle extending laterally outwardly from said endless wall entirely between the planes of the top of said endless wall and the surface of said griddle.

References Cited in the file of this patent

UNITED STATES PATENTS

| 1,257,599 | Hadaway | Feb. 26, 1918 |
| 1,291,423 | Crary | Jan. 14, 1919 |
| 1,733,450 | Detwiler | Oct. 29, 1929 |
| 2,164,813 | Gunther | July 4, 1939 |
| 2,198,647 | Wolcott | Apr. 30, 1940 |
| 2,430,582 | Reich | Nov. 11, 1947 |
| 2,603,740 | Buttero | July 15, 1952 |